United States Patent [19]

Pinto

[11] Patent Number: 4,624,321

[45] Date of Patent: Nov. 25, 1986

[54] LAWN EDGER WHEEL MECHANISM

[75] Inventor: Ross E. Pinto, Redondo Beach, Calif.

[73] Assignee: Tru-Cut, Inc., Los Angeles, Calif.

[21] Appl. No.: 657,374

[22] Filed: Oct. 3, 1984

[51] Int. Cl.⁴ ............................................ A01B 45/04
[52] U.S. Cl. ...................................... 172/15; 56/16.7; 74/104
[58] Field of Search ..................... 172/13, 15, 16, 17; 74/102, 104; 56/17.2, 17.5, 17.1, 16.7; 280/906; 301/1, 111, 128, 119, 121

[56] References Cited

U.S. PATENT DOCUMENTS

| | | | |
|---|---|---|---|
| 2,902,097 | 9/1959 | Cairns | 172/15 |
| 3,055,438 | 9/1962 | Wood | 172/15 |
| 3,090,186 | 5/1963 | Dykes | 56/17.2 |
| 3,187,120 | 6/1965 | Akst | 74/104 X |

OTHER PUBLICATIONS

McLane Lawn Edger Flyer for Model 100–2R6–C.
Power–Trim Lawn Edger Flyer Stamped by American Auto Service, No. Hollywood, CA.

*Primary Examiner*—Richard J. Johnson
*Attorney, Agent, or Firm*—Sheldon & Mak

[57] ABSTRACT

A lawn edger wheel mechanism for laterally shifting a front wheel to clear an adjustable cutting blade of the lawn edger comprises a latched detent member defining a plurality of lateral wheel positions. The wheel can be laterally guided on a carrier located by a transverse support shaft, the carrier being prevented from rotating about the shaft by engagement with the detent member, the detent member being formed on a cross member of a base of the lawn edger. A lever, pivotably mounted to the base can engage a bearing member located on the carrier between the support shaft and the detent member for convenient lateral movement of the wheel without binding of the carrier.

18 Claims, 3 Drawing Figures

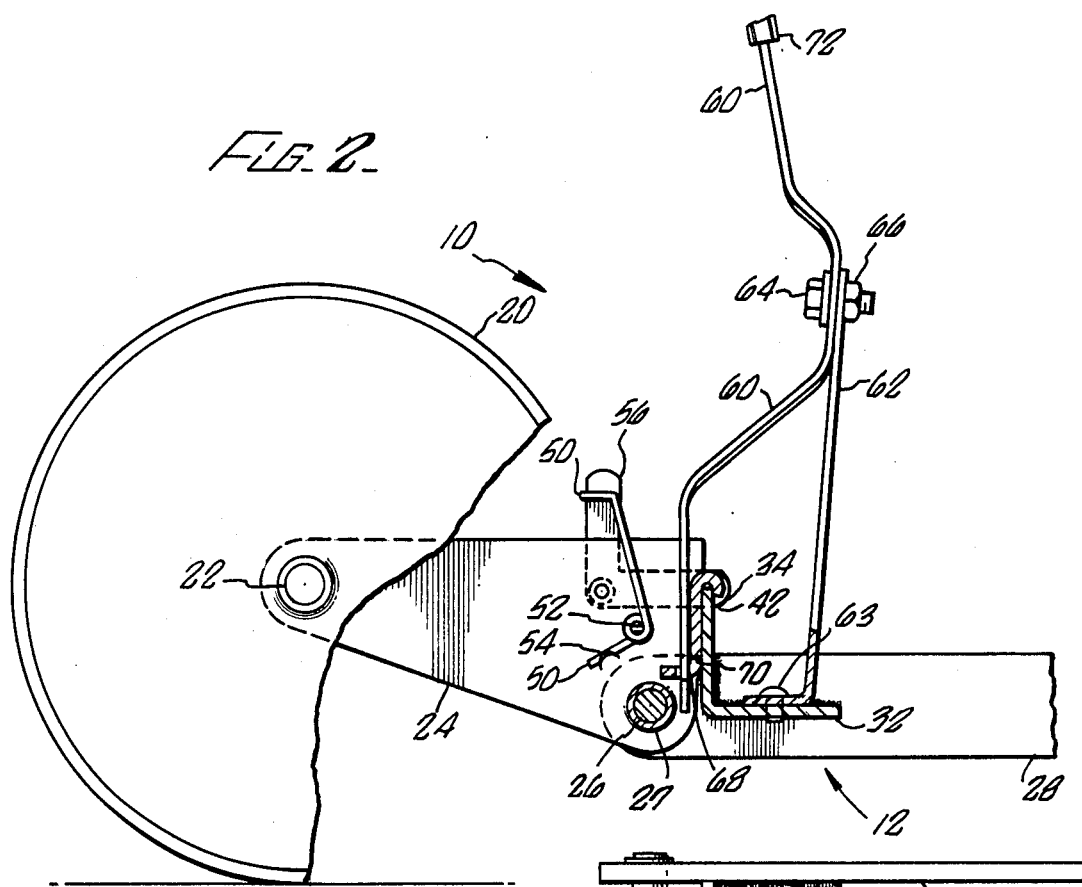
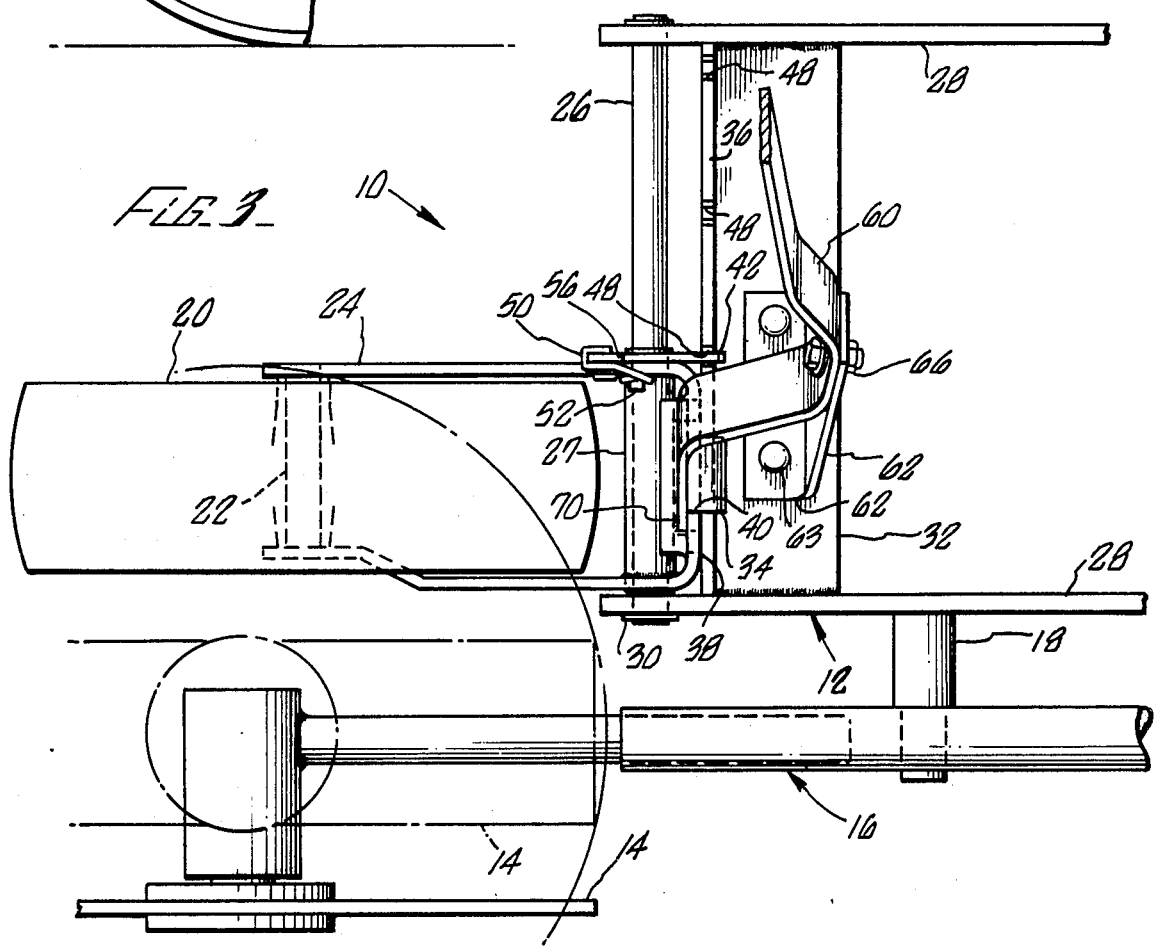

LAWN EDGER WHEEL MECHANISM

BACKGROUND

This invention relates to power lawn edgers, and more particularly to lawn edgers having an adjustable rotary cutting blade.

Typical lawn edgers in the prior art have a belt-driven cutting blade on an adjustable arm, the arm providing for selection of both cutter height and blade cutting angle. Usually, a selection of cutter blade angles between vertical and horizontal is provided.

In order to provide wheel support of the lawn edger at a point near the cutting blade, for both the vertical and the horizontal blade position, some lawn edgers in the prior art have a supporting wheel that can be laterally positioned to provide close support near the blade in the vertical position and clearance for the blade in the horizontal position.

The lateral wheel adjustment mechanisms for lawn edgers in the prior art have numerous disadvantages. For example, one arrangement permitting lateral adjustment of the wheel comprises a supporting wheel slideably mounted on a long, transverse axle. A slotted spacer that can be attached to the axle is used to retain the wheel at a selected end of the axle. Lateral adjustment of the wheel is performed by removing the spacer from the axle, sliding the wheel on the axle, then replacing the spacer on an opposite side of the wheel.

A disadvantage of this prior art arrangement is that the spacer is difficult to remove and replace on the axle. An operator must reach down near ground level, grasp the spacer, rotating it so that he can pull in a direction opposite the slot, then remove the spacer against an interference fit between the slot and the axle. When replacing the spacer, the operator must, while avoiding movement of the wheel from one end of its travel, position the slot of the spacer against the axle, then push the spacer over the axle against the interfernce fit.

Another disadvantage of this prior art arrangement is that the wheel is difficult to slide along the axle, especially when there has been an accumulation of dirt and debris from operation of the lawn edger. On one hand, the wheel tends to bind on the axle when it is pushed laterally at an outside point; on the other hand, axle supporting members interfere with pushing laterally at a point near the axle, and an operator can produce only limited lateral force near ground level where the wheel is located.

Another disadvantage of this prior art arrangement is that the axle and support therefor, being fixedly mounted to the lawn edger, must be positioned to clear the blade in all blade orientations. The cutting blade of lawn edgers in the prior art can be lifted above a normal cutting height for disengaging drive power from the blade. This requires that the blade, when oriented horizontally, be lifted past the axle without colliding therewith. In order to permit lateral movement of the wheel reasonably close to the blade when the blade is oriented vertically, the axle must be located about 6 inches to the rear of the blade axis. Because the axle is located about 6 inches behind the blade axis, the lawn edger is awkward to maneuver, and the blade, when oriented vertically, generates a wide ditch while cutting around corners.

A further disadvantage of this prior art arrangement is that the spacer might be jarred loose from the lawn edger or otherwise become lost.

In another example of the wheel adjustment mechanisms in the prior art, the wheel is mounted on a carriage, and the adjustment is performed by loosening a locking thumb screw, sliding the carriage laterally along a square, tubular bar, and then tightening the thumb screw against the bar.

A disadvantage of this prior art arrangement is that the carriage tends to bind on the bar, making the adjustment difficult. This is because the wheel is cantilevered from the bar, producing large force reactions against the bar, even when the lawn edger is lifted to raise the wheel from the ground. It is difficult to apply sufficient lateral force to the carriage, at a point proximate to the bar, located near ground level, to overcome this binding of the carriage.

Another disadvantage of this prior art arrangement is that it is unsafe in that the thumb screw tends to vibrate loose, becoming ineffective. Left unattended, the thumb screw will work completely free, possibly becoming lost. More seriously, the carriage may move into the path of the blade, with a danger of injury to the operator from being struck by flying fragments. Therefore, the thumb screw must be severely tightened, a difficult operation likely to cause permanent deformation of the bar and premature failure of the thumb screw.

Thus there is a need for a lawn edger wheel mechanism for lateral adjustment of a supporting wheel that provides support of the edger close to the blade, has no loose parts which may become lost, and is both safe and easy to use.

SUMMARY

The present invention is directed to a lawn edger wheel mechanism that meets these needs. Lateral movement of the wheel is easily accomplished by means of a handle located at a convenient height above the wheel, the wheel being positively latched in selected lateral positions.

The lawn edger wheel mechanism comprises a supporting wheel capable of lateral movement with respect to a lawn edger base for supporting the edger close to an adjustable cutting blade thereof, a detent member defining a plurality of lateral wheel positions, and means engaging the detent member for latching the wheel in a selected lateral position. One position, farthest from the blade, is used when the blade is oriented horizontally. Another position, closest to the blade, can be used when the blade is oriented vertically.

Preferably at least one additional latched position of the wheel is provided for positioning the wheel in line with the lawn edger center of gravity for maximum rolling stability.

Preferably the detent member is a bar mounted transversely on the base, the bar having a plurality of spaced notches for ease of manufacture.

Preferably the wheel is mounted on a laterally guided carrier for providing unimpeded clearance between the base and the blade, the carrier having a movable latch member biased into engagement with the detent member and a latch release handle for conveniently releasing the latch during lateral adjustment of the wheel.

Preferably a lever is connected between the base and the wheel for producing lateral movement of the wheel, the lever coupling lateral force to the wheel proximate to a drag force line of action on the lawn edger for lateral movement of the carrier without binding.

Preferably the lever is operated by a positioning handle located at a convenient height higher than the wheel for easy lateral movement of the wheel.

Thus a lawn edger wheel mechanism for lateral adjustment of a supporting wheel is provided that supports the edger close to the blade, has no loose parts that may become lost, and is both safe and easy to use.

DRAWINGS

These and other features, aspects and advantages of the present invention will become better understood with reference to the following description, appended claims, and accompanying drawings where:

FIG. 2 is a fragmentary sectional elevational view of the lawn edger taken along line 2—2 in FIG. 1; and FIG. 3 is a fragmentary plan view of the lawn edger of FIG. 1.

DESCRIPTION

Figure 1:
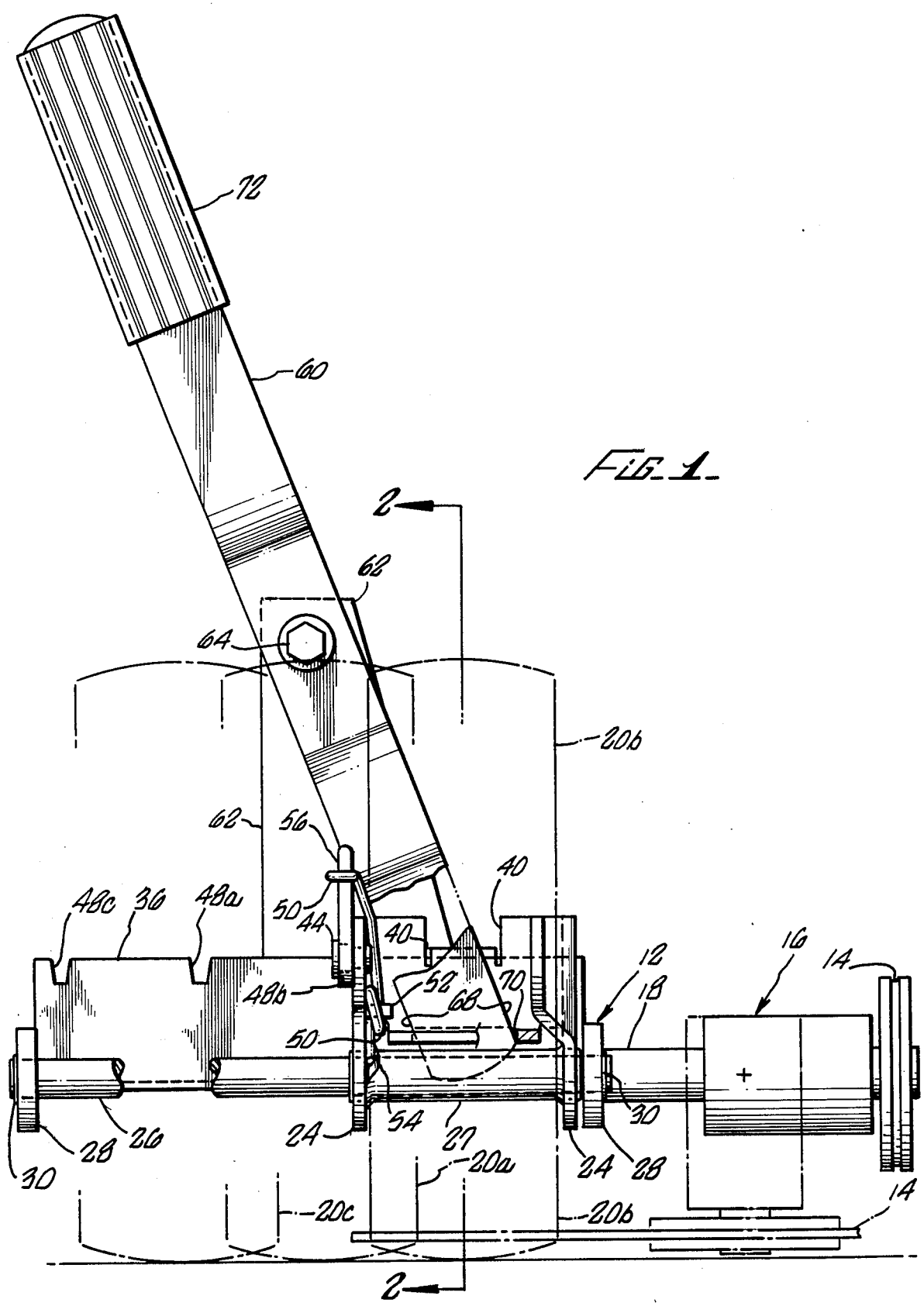
FIG. 1 is a front fragmentary elevational view of a lawn edger having a wheel mechanism according to the present invention.

The present invention is directed to a mechanism for laterally shifting and latching a supporting wheel of a lawn edger while providing clearance for an adjustable cutting blade of the lawn edger.

With reference to FIGS. 1-3, a lawn edger 10, having a frame 12, drives a rotary cutting blade 14, the cutting blade 14 being adjustably oriented between vertical and horizontal cutting positions. The cutting blade 14 can also be adjustably positioned at a desired cutting height. Adjustable support for the cutting blade 14 is provided conventionally by a cutter arm 16, shown schematically in the drawings. The cutter arm 16 is pivotally mounted on a cutter support 18, the cutter support 18 being fixedly mounted to the frame 12.

The frame 12 is supported by a wheel 20, schematically shown, and other wheels, not shown. The wheel 20 rotates on an axle 22, the axle 22 being fixedly mounted in a yoke 24. The yoke 24 is slidably mounted on a support shaft 26 for lateral movement of the wheel 20, the support shaft 26 being parallel to the axle 22 and fixedly supported at opposite ends by corresponding side members 28 of the frame 12. A tube 27, welded at opposite sides of the yoke 24, acts as a bearing for the support shaft 26 and stiffens the yoke 24 against lateral loads on the wheel 20. The support shaft 26, located beyond reach of the cutting blade 14, is held in engagement with the side members 28 of the frame 12 by a pair of retaining rings 30. The frame 12 includes a cross member 32, parallel to the shaft 26, welded between the side members 28.

Preferably a tab 34 on the yoke 24 engages the cross member 32 for preventing rotation of the yoke 24 about the shaft 26. Preferably the tab 34 engages the cross member 32 at a point located a substantial distance from the shaft 26, limiting force reactions between the yoke 24, the shaft 25, and the cross member 32 produced by loading of the wheel 20. This feature can be conveniently provided by making the cross member 32 in the form of an angle, a leg 36 thereof extending vertically above the side members 28, in sliding contact with a base member 38 of the yoke 24. The tab 34 can be formed by bending a portion of the base member 38, between a pair of slits 40 therein, over the leg 36 for holding the base member 38 against the leg 36. When the wheel 20 is supporting the lawn edger 10, reaction forces between the yoke 24 and the cross member 32 are spread over a relatively large area of the base member 38 contacting the leg 36 for light stress loading of the contacting surfaces.

When the wheel 20 is lifted from ground level, an opposite reaction force between the yoke 24 and the cross member 32 is supplied by engagement of the tab 34 against the leg 36 on a side opposite the base member 38. This opposite reaction force is much smaller than the reaction force resulting when the wheel 20 is loaded by the lawn edger 10, only lightly loading the tab 34. The yoke 24 thus acts as a carriage for lateral movement of the wheel along the support shaft 26 and the leg 36 of the cross member 32. When the cutting blade 14 is oriented horizontally, it may be freely engaged and adjusted for cutting height without colliding with the support shaft 26 on the slide members 28.

A latch member 42 is pivotally held against the yoke 24 by a shoulder rivet 44. The latch member 42 can be selectively engaged with a plurality of notches 48 formed in the leg 36 of the cross member 32.

The notches 48 on the leg 36 define lateral positions for the wheel 20 at opposite ends of travel of the yoke 24 along the shaft 26, and preferably at least one intermediate or normal position designated 20a in FIG. 1. The normal position 20a of the wheel 20, defined by notch 48a, is aligned along the longitudinal center of gravity of the lawn edger 10 for stable support of the frame 12 to prevent inadvertant tipping of the lawn edger 10. One of the notches 48b in the leg 36 defines a second postion 20b of the wheel 20 for support of the lawn edger 10 at a point close to the cutting blade 14 when the cutting blade 14 is oriented vertically or nearly vertically. Another of the notches 48c defines a third position 20c of the wheel 20 for providing support of the lawn edger 10 at a point close to the cutting blade 14 when the cutting blade 14 is oriented horizontally. Thus the leg 36 of the cross member 32 acts as a detent member for lateral location of the wheel 20.

It should be understood that other forms of detenting can be used in place of the latch member 42 engaging the notches 48 on the leg 36, within the scope of the present invention. For example, a spring-loaded pin can engage radially positioned holes in a disk, or pegs protruding a bar can engage a slot of a latch. Thus selective engagement with any suitable form of discontinuity can be used for detenting.

A hairspring 50, coiled about an anchor tab 52, biases the latch member 42 into engagement with the notches 48 in the leg 36. The anchor tab 52 can be formed by piercing the yoke 24 at a point near the shoulder rivet 44, providing a low-cost alternative to spring provisions on the shoulder rivet 44. The hairspring 50 can be loaded against a boss 54, formed by piercing the yoke 24 a short distance from the anchor tab 52. The hairspring 50 can engage a latch release handle 46, formed as an extension of the latch member 42 above the yoke 24. The latch member 42 and the boss 54 combine to retain the hairspring 50 axially in position on the anchor pin 52.

Preferably a shift lever 60, pivotally mounted to a bracket 62 on the frame 12, is connected to the yoke 24 for facilitating lateral movement of the wheel 20. The bracket 62 can be attached to the cross member 32 by a pair of bracket screws 63, the bracket 62 extending generally vertically to a point preferably higher than the top of the wheel 20 for convenient operation of the shift lever 60. A pivot screw 64, held in place by a nut 66, locates the shift lever 60 against the bracket 62. A bearing surface 68 at each side of the shift lever 60 slidably engages a slot 70 in the yoke 24. The slot 70 can be formed as a horizontal U-shaped tab extending from the base member 38, for allowing vertical movement of the bearing surfaces 68 during lateral movement of the shift lever 60. The shift lever 60 extends above the pivot screw 64, a shift handle 72 being pressed thereon at a convenient height above the wheel 20 for effective operation.

Preferably the bearing surfaces 68 on the shift lever 60 engage the slot 70 at a point between sliding contact points of the yoke 24 with the support shaft 26 and the leg 36. Thus the bearing surfaces 68 engage the yoke 24 at a point proximate to a drag force line of action associated with lateral movement of the yoke 24 along the support shaft 26 and the leg 36 of the cross member 32, for avoiding binding of the yoke 24 during lateral movement of the wheel 20.

In operation, when it is desired to laterally move the wheel 20 on the lawn edger 10, an operator moves the shift handle 72 laterally while holding the latch release handle 56 for releasing the latch member 42. The shift handle 72 is operated in a direction opposite to the desired movement of the wheel 20; therefore, the movement can be facilitated by the application of oppositely directed lateral forces at the shift handle 72 and the latch release handle 56. Following initial movement of the yoke 24, the operator can allow the latch member 42 to engage another of the notches 48, locking the wheel 20 in the desired lateral position.

The mechanism of the present invention provides support for a lawn edger close to the cutting blade 14, the axle 22 not interfering with vertical adjustment of the cutting blade 14, when the cutting lade 14 is oriented horizontally. The mechanism is safe to use in that the latch member 42 cannot vibrate loose or become lost. There is no danger that the wheel 20, once in a latched position, would work loose and collide with the cutting blade 14 during operation of the lawn edger 10.

The mechanism is easy to use in that the latch member 42 can be released by merely collapsing the hairspring 50; moreover, lateral force applied at a conviently effective height is effectively coupled to position the wheel 20 without causing binding.

Although the present invention has been described in considerable detail with regard to certain versions thereof, other versions are possible. Therefore, the spirit and scope of the appended claims should not necessarily be limited to the descriptions of the versions contained herein.

What is claimed is:

1. A wheel mechanism for supporting a lawn edger base at laterally selectable positions while providing corresponding clearance for an adjustable cutting blade of the lawn edger, the mechanism comprising:
   (a) a supporting wheel slidably mounted to the base for lateral location of the wheel for clearing the blade;
   (b) a detent member having at least three spaced discontinuities thereon for defining a corresponding number of lateral wheel positions;
   (c) means for locking the wheel in a selected one of the lateral positions by engaging the detent member; and
   (d) means for biasing the locking means into engagement with the detent member.

2. A lawn edger comprising:
   (a) a wheeled base;
   (b) an adjustable cutting blade;
   (c) means for lateral movement of at least one wheel with respect to the cutting blade;
   (d) a detent member having at least three spaced discontinuities thereon for defining a corresponding number of lateral wheel positions of the wheel; and
   (e) spring biased means engaging the spaced discontinuities of the detent member for latching the wheel in a selected lateral wheel position.

3. The lawn edger of claim 2, wherein a drag force line of action is associated with lateral movement of the wheel, the lawn edger further comprising:
   (a) a lever engaging the base for producing the lateral movement of the wheel; and
   (b) bearing means for connecting the lever to the wheel, the bearing means being located proximate to the drag force line of action for preventing lateral binding of the wheel.

4. The lawn edger of claim 3, further comprising a positioning handle for operating the lever, the positioning handle being located higher than the wheel for facilitating the lateral movement of the wheel.

5. The lawn edger of claim 2, wherein the detent member comprises a bar mounted transversely to the base.

6. The lawn edger of claim 5, wherein the wheel is on a laterally guided carrier and the means engaging the spaced discontinuities of the detent member comprises:
   (a) a latch member movably mounted on the carrier;
   (b) means for biasing the latch member into engagement with the discontinuities of the detent member; and
   (c) handle means for releasing the latch member.

7. The lawn edger of claim 5 wherein the wheel is on a carrier, the carrier being slidably guided by a support shaft located on the base, the carrier slidably engaging the detent member for preventing rotation of the carrier about the support shaft.

8. The lawn edger of claim 2, wherein the discontinuities on the detent member are notches formed in the detent member.

9. A lawn edger comprising:
   (a) a wheeled base;
   (b) an adjustable cutting blade;
   (c) a transverse support shaft fixed to the base;
   (d) a carrier for at least one wheel of the lawn edger, the carrier being slidably guided by the support shaft;
   (e) a transverse detent member fixed to the base, the detent member having a plurality of fixed discontinuities therein for defining a plurality of lateral wheel positions of the carrier;
   (f) a latch member movably mounted on the carrier;
   (g) means for biasing the latch member into engagement with the discontinuities of the detent member;
   (h) handle means for releasing the latch means;
   (i) means for slidably engaging the carrier with the detent member for preventing rotation of the carrier about the support shaft;
   (j) a lever engaging the base for producing the lateral movement of the wheel;
   (k) bearing means for connecting the lever to the carrier, the bearing means being located proximate to a drag force line of action associated with lateral movement of the carrier along the support shaft and the detent member; and (l) a positioning handle for operating the lever, the positioning handle being located higher than the wheel for facilitating the lateral movement of the wheel.

10. A wheel mechanism for supporting a lawn edger base at laterally selectable positions while providing corresponding clearance for an adjustable cutting blade of the lawn edger, the mechanism comprising:

(a) a supporting wheel slidably mounted to the base for lateral location of the wheel for clearing the blade;

(b) a detent member having a plurality of spaced discontinuities thereon for defining a plurality of lateral wheel positions;

(c) a latch member movably mounted for locking the wheel in a selected one of the lateral positions, the latch member having a released position for permitting lateral movement of the latch member with respect to the detent member, and an engaged position for preventing the lateral movement;

(d) means for biasing the latch member into the engaged position; and (e) handle means for moving the latch member into the released position.

11. The wheel mechanism of claim 10 wherein the wheel is on a laterally guided carrier and the latch member is movably mounted on the carrier.

12. A lawn edger comprising:
(a) a wheeled base;
(b) an adjustable cutting blade;
(c) means for lateral movement of at least one wheel with respect to the cutting blade;
(d) a detent member having a plurality of spaced discontinuities thereon for defining a plurality of lateral wheel positions of the wheel; and
(e) a latch member movably mounted for locking the wheel in a selected one of the lateral positions by engaging the detent member;
(f) means for biasing the latch member into engagement with the detent member; and
(g) handle means for releasing the latch member.

13. The lawn edger of claim 12, wherein the detent member comprises a bar mounted transversely to the base.

14. The lawn edger of claim 12, wherein the discontinuities on the detent member are notches formed in the detent member.

15. A lawn edger comprising:
(a) a wheeled base;
(b) an adjustable cutting blade;
(c) means for lateral movement of at least one wheel with respect to the cutting blade, the wheel being on a laterally guided carrier;
(d) a detent member having a plurality of spaced discontinuities thereon for defining a plurality of lateral wheel positions of the wheel; and
(e) means engaging the spaced discontinuities of the detent member for latching the wheel in a selected lateral wheel position, the engaging means comprising:
  (i) a latch member movably mounted on the carrier;
  (ii) means for biasing the latch member into engagement with the discontinuities of the detent member; and
  (iii) handle means for releasing the latch member.

16. A lawn edger comprising:
(a) a wheeled base;
(b) an adjustable cutting blade;
(c) means for lateral movement of at least one wheel with respect to the cutting blade, the wheel being on a laterally guided carrier, the carrier being guided by a support shaft located on the base;
(d) a detent member spaced from the shaft having a plurality of spaced discontinuities thereon for defining a plurality of lateral wheel positions of the wheel, the detent member being slidably engaged by the carrier for preventing rotation of the carrier about the support shaft; and
(e) means engaging the spaced discontinuities of the detent member for latching the wheel in a selected lateral wheel position.

17. A lawn edger comprising:
(a) a wheeled base;
(b) an adjustable cutting blade;
(c) means for lateral movement of at least one wheel with respect to the cutting blade, a drag force line of action being associated with lateral movement of the wheel;
(d) a detent member having a plurality of spaced discontinuities thereon for defining a plurality of lateral wheel positions of the wheel;
(e) means engaging the spaced discontinuities of the detent member for latching the wheel in a selected lateral wheel position;
(f) a lever engaging the base for producing the lateral movement of the wheel; and
(g) bearing means for connecting the lever to the wheel, the bearing means being located proximate to the drag force line of action for preventing lateral binding of the wheel.

18. The lawn edger of claim 17, further comprising a positioning handle for operating the lever, the positioning handle being located higher than the wheel for facilitating the lateral movement of the wheel.

* * * * *